United States Patent
Jung et al.

(10) Patent No.: US 6,931,322 B2
(45) Date of Patent: Aug. 16, 2005

(54) METHOD FOR CORRECTING POSITION ERROR IN NAVIGATION SYSTEM

(75) Inventors: Mun Ho Jung, Seoul-si (KR); Moon Jeung Joe, Anyang-si (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 10/652,031

(22) Filed: Sep. 2, 2003

(65) Prior Publication Data

US 2004/0044477 A1 Mar. 4, 2004

(30) Foreign Application Priority Data

Sep. 2, 2002 (KR) .............................. 10-2002-0052413

(51) Int. Cl.[7] .............................................. G06F 19/00
(52) U.S. Cl. .................. 701/216; 701/214; 342/357.14
(58) Field of Search ................. 701/214, 216, 701/217, 208; 342/357.14, 357.13, 358; 340/995.25, 995.28

(56) References Cited

U.S. PATENT DOCUMENTS

| | | | | |
|---|---|---|---|---|
| 5,383,127 A | * | 1/1995 | Shibata | 701/216 |
| 5,488,559 A | * | 1/1996 | Seymour | 701/208 |
| 5,852,791 A | * | 12/1998 | Sato et al. | 701/217 |
| 5,902,349 A | * | 5/1999 | Endo et al. | 701/202 |
| 5,906,653 A | * | 5/1999 | Ichimura et al. | 701/207 |
| 5,948,043 A | * | 9/1999 | Mathis | 701/208 |
| 6,453,238 B1 | * | 9/2002 | Brodie et al. | 701/216 |
| 6,597,987 B1 | * | 7/2003 | Barton | 701/213 |

OTHER PUBLICATIONS

Abstract for Japanese Publication No. 2002–213979, published Jul. 31, 2002.
Abstract for U.S. Patent No. 5,394,333, issued Feb. 28, 1995.

* cited by examiner

Primary Examiner—Michael J. Zanelli
(74) Attorney, Agent, or Firm—Birch, Stewart, Kolasch & Birch, LLP (57) ABSTRACT

A method for correcting position error in a navigation system enables one to more accurately match a position measurement of a moving object on a digital map. Particularly, the method comprises the steps of: receiving a current position measurement of a moving object from GPS/DR (Dead Reckoning)-based information; correcting the current location measurement using a displacement-corrected value; performing map matching using the corrected current position measurement; calculating variation of correction angle by extracting a current correction angle out of the map matching result; converting and correcting a previous displacement-corrected value to the current correction angle; and compensating the displacement-corrected value by applying a predetermined constant to the converted displacement-corrected value, and storing the compensated displacement-corrected value.

16 Claims, 6 Drawing Sheets

METHOD FOR CORRECTING POSITION ERROR IN NAVIGATION SYSTEM

This nonprovisional application claims priority under 35 U.S.C. §119(a) on Patent Application No. 10-2002-0052413 filed in KOREA on Sep. 2, 2002, which is herein incorporated by reference.

BACKGROUND OF THE INVENTION

1. Field of the Invention

The present invention relates in general to a navigation system, more particularly, to a method for correcting position error in a navigation system which utilizes a map matching (MM) in order to provide an accurate information on a current position of a moving object by correcting position errors in consideration of position measurements of a mobile object including vehicles, airplanes and ships, and the shape of a road (i.e. link) displayed on a digital map.

2. Discussion of the Background Art

An essential element of navigation systems is the determination of a current position of a moving object (e.g. vehicles) within an allowable range of error, and providing such information to a driver of the moving object continuously in real time mode because the moving object's current position is used for marking a current position of the mobile object, providing route guidance information, and perceiving the surrounding road environment.

Providing incorrect current positions of the moving object or providing position information discontinuously may cause serious damages on the safety of an operator of the moving object, so the determination of current positions of the moving object is very important.

Navigation systems do not always provide accurate information on a current position of the moving object. That is, the error range of sensors such as a gyro (or gyroscope) or electronic compass built in the moving object could be great, depending on rotation direction of the moving object. Also, when the moving object stops, its heading may be deflected in one direction or be changed, making position errors on heading of the moving object. Moreover, measurement of traveling distance of the moving object using a wheel sensor can be erroneous also because the wheel sensor is very sensitive to external factors like air pressure of wheels/tires and road surface conditions.

Another material for informing the current position of the moving object is a digital map that is drawn over a central line (i.e. a solid yellow line). Many times, however, operators of moving objects do not drive along an intersection or central line on a road, and as a result, the digital map itself have errors thereon. In addition, errors are also made when inputting data in the digital map, marking the position of the moving object at an incorrect spot. Of course, these errors should be absolutely corrected.

As an attempt to solve the above problems, Korean Patent No. 216535 (Applin. No. 1997-24564) disclosed a method for measuring a current position of a moving object.

According to the above disclosure, a dead reckoning system (DR) using information collected from a heading and distance sensors attached to a moving object provides a current position of the moving object, which is designated as a first position, and by a map matching method using position matching, the first position is corrected or maneuvered onto a digital map, and this corrected position is designated as a second position. Further, the current position of the moving object is measured using a signal provided from GPS, and the current position at this time is designated as a third position. Similar to before, applying the map matching method using position matching, the third position is corrected or maneuvered onto the digital map, and this corrected position is designated as a fourth position. With these first through fourth positions, short distance driving patterns of an operator of the moving object are obtained. Afterwards, similarities between each of the short distance driving patterns at the first through fourth positions and road patterns on the digital map are compared with each other, and from the comparison, a position having the highest degree of similarity is finally selected as the current position of the moving object.

However, the above technique did not really use the result of map matching to trace the moving object. Instead, combinations of the DR and GPS systems, namely signals from sensors and GPS, were mainly used to match the current position of the moving object being measured with the digital map. Therefore, it was rather difficult to do perfect matching of the position of the moving object with the digital map.

For example, depending on geographical features in an area where the moving object is at, the roads are sometimes straight but sometimes they are curved. The position of the moving object on a straight road can be easily matched with the digital map, but on a curved road, accurate positioning is very difficult.

SUMMARY OF THE INVENTION

An object of the invention is to solve at least the above problems and/or disadvantages and to provide at least the advantages described hereinafter.

Accordingly, one object of the present invention is to solve the foregoing problems by providing a method for correcting position error in a navigation system, enabling to match a measurement position of a moving object with a digital map.

Another object of the present invention to provide a method for correcting position error in a navigation system, capable of accurate matching of a current position of a moving object with a link on a digital map by measuring the current position of the moving object, adding to a measurement a displacement-corrected value obtained from a previous map matching so as to correct the measurement, and performing map matching.

Another object of the invention to provide a method for correcting position error in a navigation system, in which a current position of a moving object is measured by using received signals based on a dead reckoning and GPS systems, and the measurement is added with a measurement a X- and Y-displacement-corrected values obtained from a previous map matching so as to correct the measurement of the current position of the moving object, and map matching is performed thereon.

Still another object of the present invention is to provide a method for correcting position error in a navigation system, in which measurement position of a moving object is used to find a node between interpolation points of a candidate link having a highest possibility to be matched on a map.

The foregoing and other objects and advantages are realized by providing a method for correcting position error in a navigation system, the method including the steps of: receiving a current position measurement of a moving object from GPS/DR (Dead Reckoning)-based information; correcting the current location measurement using a displacement-corrected value; performing map matching using the corrected current position measurement; calculating variation of correction angle by extracting a current correction angle out of the map matching result; converting and correcting a previous displacement-corrected value to the current correction angle; and compensating the displacement-corrected value by applying a predetermined constant to the converted displacement-corrected value, and storing the compensated displacement-corrected value.

Another aspect of the invention provides a method for correcting position error in a navigation system, the method including the steps of: receiving a current position measurement of a moving object by making use of a GPS/DR (Dead Reckoning) method; correcting the current location measurement using a previous displacement-corrected value; performing map matching using the corrected current position measurement; and calculating out of the map matching result a variation of correction angle, and a compensated displacement-corrected value along heading by extracting a current correction angle out of the map matching result.

Another aspect of the invention provides a method for correcting position error in a navigation system, the method including the steps of: receiving a GPS position measurement; extracting candidate links within a predetermined search range around the GPS position measurement; among a plurality of interpolation points on the candidate links, selecting a spot between interpolation points with highest possibilities; and among candidate links including the selected spot between interpolation points, selecting a link with a highest possibility of having a moving object, and performing map matching.

Additional advantages, objects, and features of the invention will be set forth in part in the description which follows and in part will become apparent to those having ordinary skill in the art upon examination of the following or may be learned from practice of the invention. The objects and advantages of the invention maybe realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a method for correcting position error in a navigation system according to a preferred embodiment of the invention in reference to the accompanying drawings.

Figure 1:
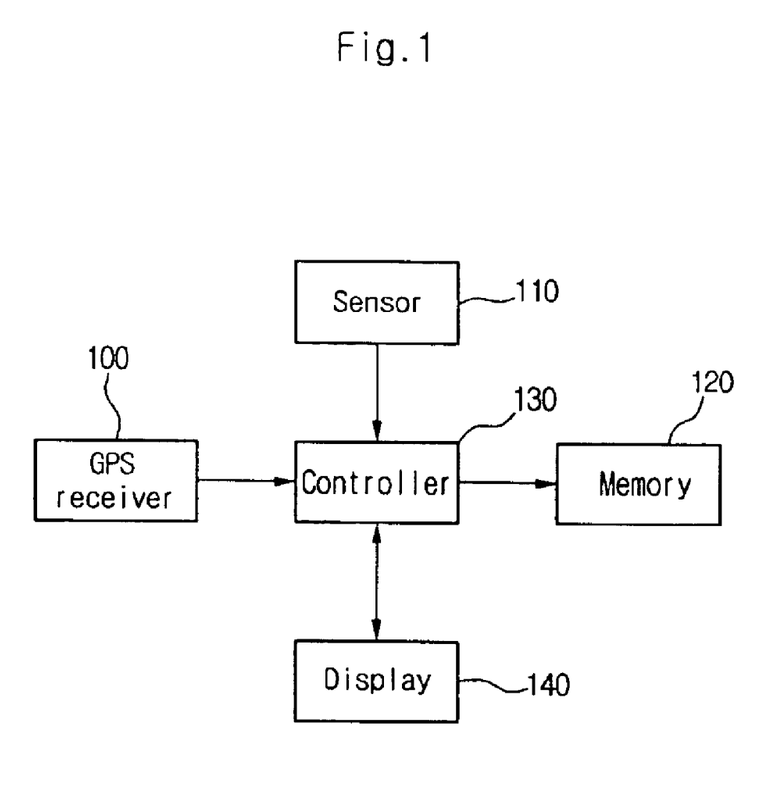
FIG. 1 is a block diagram of the configuration of a navigation system according to one embodiment of the present invention.

FIG. 1 is a block diagram of the configuration of a navigation system according to one embodiment of the present invention.

As shown in FIG. 1, the navigation system includes a GPS receiver 100 for detecting current position information of a moving object by using a signal transmitted from a plurality of satellite GPSs, a sensor 110 for detecting driving speed and rotational direction of the moving object by making use of a gyro and speed sensor installed in the moving objection, a memory 120 for storing digital map information, information on the moving object's driving path and an operational program, a controller 130 for deciding a current position of the moving object by correcting the moving object's current position measured using output signals from the GPS receiver 100 and the sensor 110 into a map-matched value on a digital map, the controller 130 being operated in accordance with the operational program stored in the memory 120, and a display 140, under control of the controller 130, for displaying the digital map and the current position of the moving object on the digital map.

Figure 2:
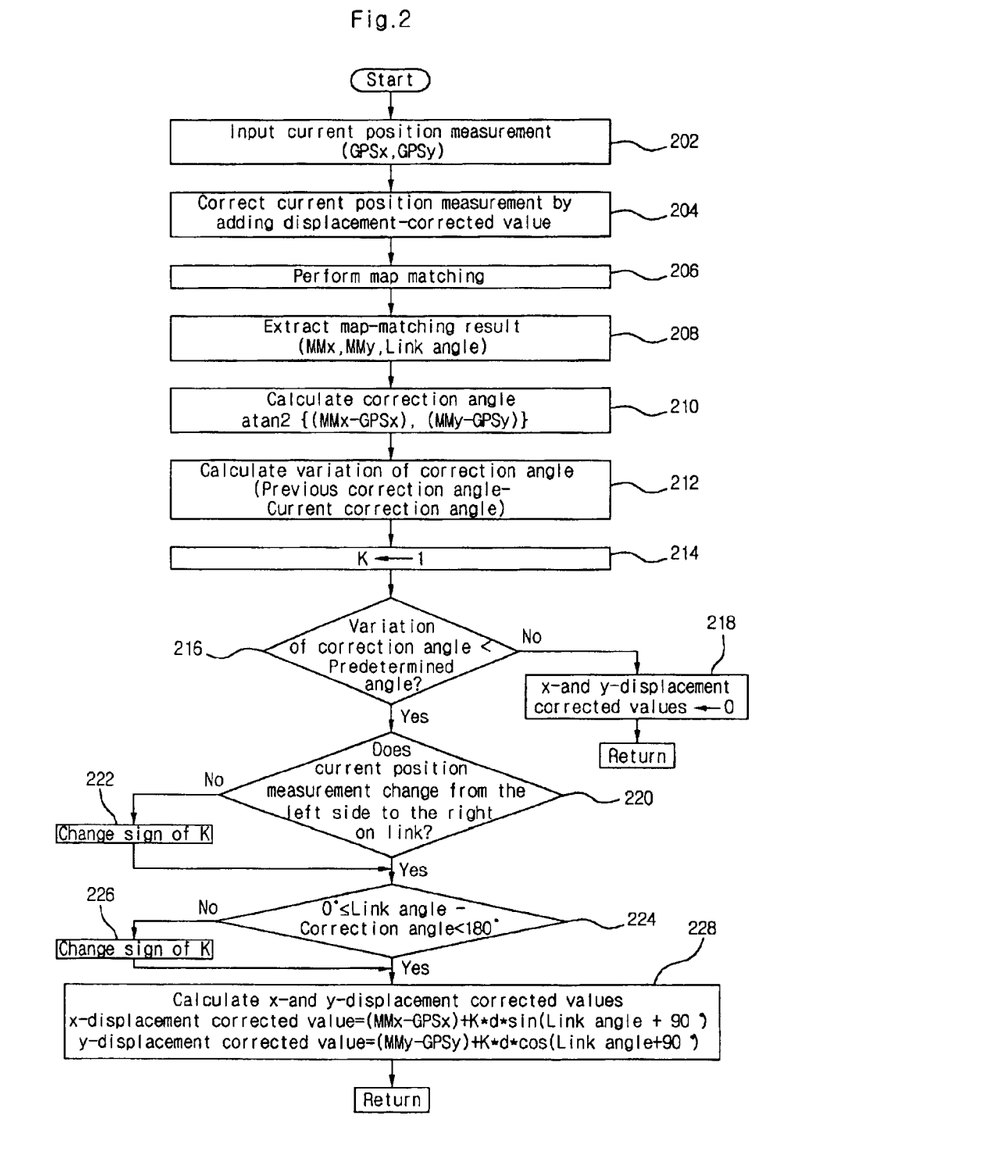
FIG. 2 is a flow chart describing a method for correcting position error in a navigation system according to one embodiment of the present invention.

A method for correcting position error in a navigation system with the configuration depicted in FIG. 1 is now illustrated in FIG. 2

First of all, a controller 130 receives a measurement (GPSx, GPSy of a current position of a moving object (S202) where the measurement is made by using output signals from a GPS receiver 100 and DR-based sensor 110. Adding the measurement (GPSx, GPSY) of the current position of the moving object to a displacement-corrected value obtained from previous map matching, a new measurement of the current position is obtained (S204). The displacement-corrected value from a previous map matching is stored in a memory 120. Here, the map matching displacement-corrected value can be obtained from Equations 2 and 3 which are explained later.

This new corrected measurement of the current position in step 204 is then matched with a digital map stored in the memory 120 (S206). That is, for more precise map matching, the measurement of the current position of the moving object is matched with a road on the digital map, and the position measurement is corrected accordingly.

Next, the map matching result in step 206, namely map-matched position values of the moving object (MMx, MMy), and heading of a link are extracted (S208).

And, a current correction angle is calculated applying Equation 1 below (S210).

$$\text{Current correction angle} = a\tan 2\{(MMx-GPSx), (MMy-GPSy)\} \quad [\text{Equation 1}]$$

As shown, to obtain the current correction angle, GPSx value is first subtracted from a map-matched x value (MMx) of the moving object from the true north direction, and similarly, GPSy value is first subtracted from a map-matched y value (MMy) of the moving object. Then, the resulting (x, y) is multiplied by a tan2. That is, moving direction of the object can be changed in accordance with the current correction angle.

When the calculation of the correction angle is finished, a variation of the correction angle is calculated by subtracting the previously map-matched correction angle from the current correction angle obtained in step 210 (S212). In this way, one can detect how much the current position has been displaced.

Next, a constant (K) (refer to Equation 2 below) is substituted with '1' (S214). The constant (K) is a compensation coefficient for the decision of direction, and it compensates x- and y-displacement-corrected values in the opposite direction to the horizontal motion (right/left) from a link, namely (+1, −1).

If the variation of correction angle calculated in step 212 is greater than a predetermined angle (S216), x- and y-displacement-corrected values are all initialized to '0' and reset (S218), restarting the calculation of correction values of measurement position. For example, if the variation of correction angle is greater than 60 degrees, it means the moving object made a left or right turn, so both x- and y-displacement-corrected values are initialized to '0'. The angle can also be set to be in opposition to the true north direction by the link connecting nodes on a driving path.

Meanwhile, if the variation of correction angle being calculated is less than a predetermined angle, the controller 130 changes the current position measurement to the left/right side of the link on the digital map. That is to say, it is decided whether a right previous position of the moving object has been shifted to the right side of the link from the left side or whether the object has been shifted to the left side of the link from the right side. If the current position measurement happens to be changed from left to right of the link on the digital map in step 222, the sign of the constant (K) is changed (S220).

In addition, it is decided if the variation of correction angle is within a range of 0–180 degrees. If so, that is, if the corrected position of the moving object is positioned on the right side of the link on the digital map (S226), the sign of the constant (K) is changed (S224), and using the difference between the map matched position and the corrected GPS position, x and y values corresponding to the absolute correction distance and the constant (K), new x- and y-displacement-corrected values are obtained (S228). These x- and y-displacement-corrected values of the measurement position are then stored/returned for next map matching.

In other words, new x- and y-displacement-corrected values obtained from Equation 2 are respectively replaced with ones for the current position of the moving object.

$$x\text{-displacement corrected value} = (MMx - GPSx) + K * d * \sin(\text{link angle} + 90°) \quad \text{[Equation 2]}$$

$$y\text{-displacement corrected value} = (MMy - GPSy) + K * d * \cos(\text{link angle} + 90°)$$

In the equations, 'd' denotes an absolute correction distance, and 'sin(link angle+90°)' and the 'cos(link angle+90°)' are current correction angles. To make a link angle connect nodes from the true north direction, 90 degrees are added to the link angle.

Described in the following is a calculation method of GPS/DR positions and correction displacement using map matching.

As depicted in FIG. 3, when an object moves in a certain direction within a search range 300 on a position measurement map, x- and y-displacement-corrected values passing an interpolation point 322 on a link 323 between nodes 321 are calculated.

More specifically, previous/current GPS/DR position measurements 301 and 302 and previous/current position values 311 and 312 by map matching are obtained, and a beeline (d) between the position measurements by GPS/DR and the position measurement by map matching is designated as an absolute correction distance. Here, the previously map-matched position value 311 is obtained by using the previous GPS/DR position measurement 301 and the absolute correction distance, and the currently map-matched position value 312 is obtained by using the current GPS/DR position measurement 302 and the absolute correction distance.

Figure 3A:
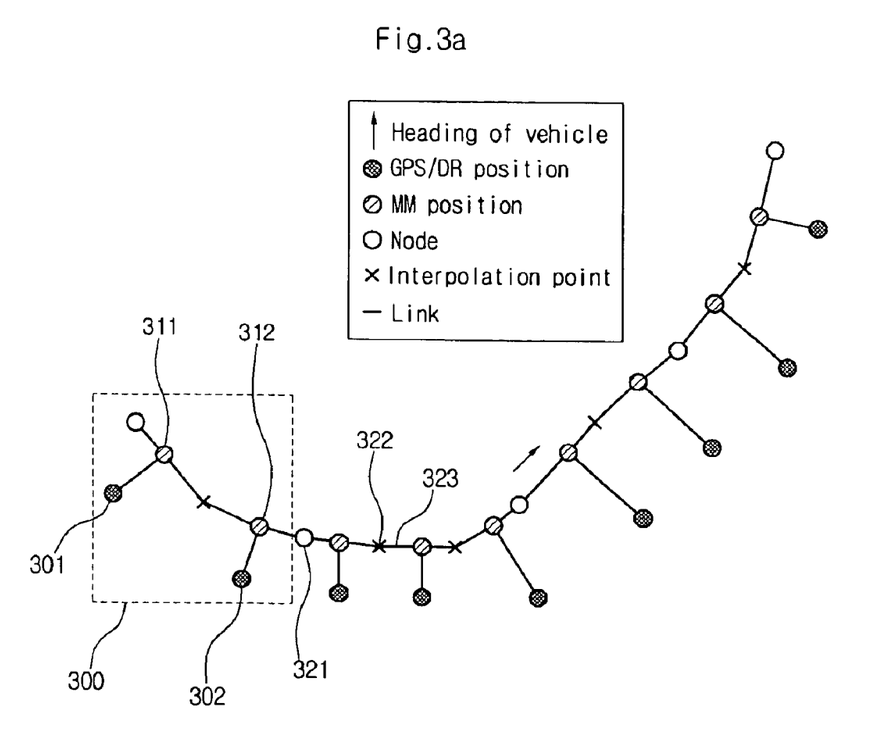
FIG. 3 is a diagram depicting a calculation method for correction displacement using a changed angle of map matching according to one embodiment of the present invention.
Figure 3B:
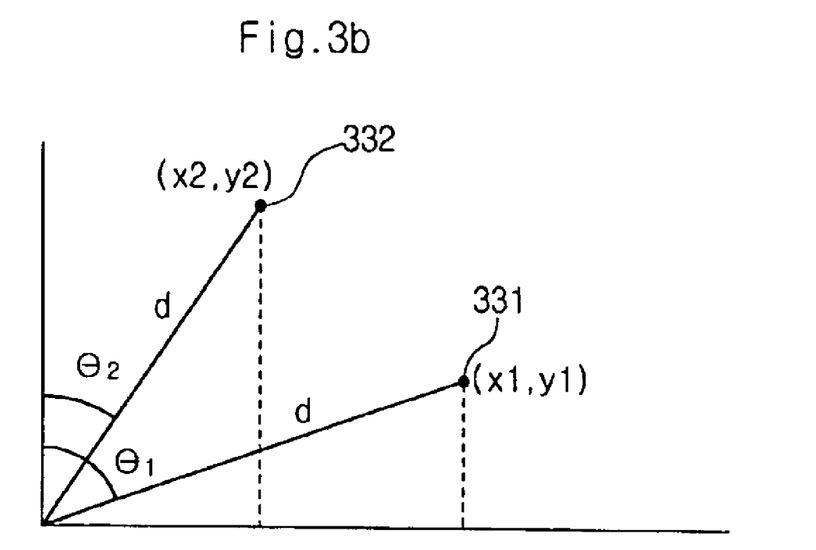

To be short, as illustrated in FIGS. 3(a) and 3(b), if a first GPS/DR position 301 and a first MM position 311 are plotted on a Cartesian coordinate system, it corresponds to the previously map-matched displacement value (x1, y1) 331. Similarly, if a newly map-matched GPS/DR position 302 and a second MM position 312 are plotted on the Cartesian coordinate system, it corresponds to the displacement-corrected value (x2, y2) 332 that is obtained from the previous map matching using the current correction angle. Here, the displacement value from the previous map matching (x1, y1) coincides with the point 331, and the new displacement value (x2, y2) coincides with the point 312.

At this time, as shown in FIG. 3(b), in case the corrected values 331 and 332 are obtained, the angle from the true north direction to the corrected value 331 is designated as $\theta_2$, and the angle to the displacement value is designated as $\theta_1$.

Figure 4:
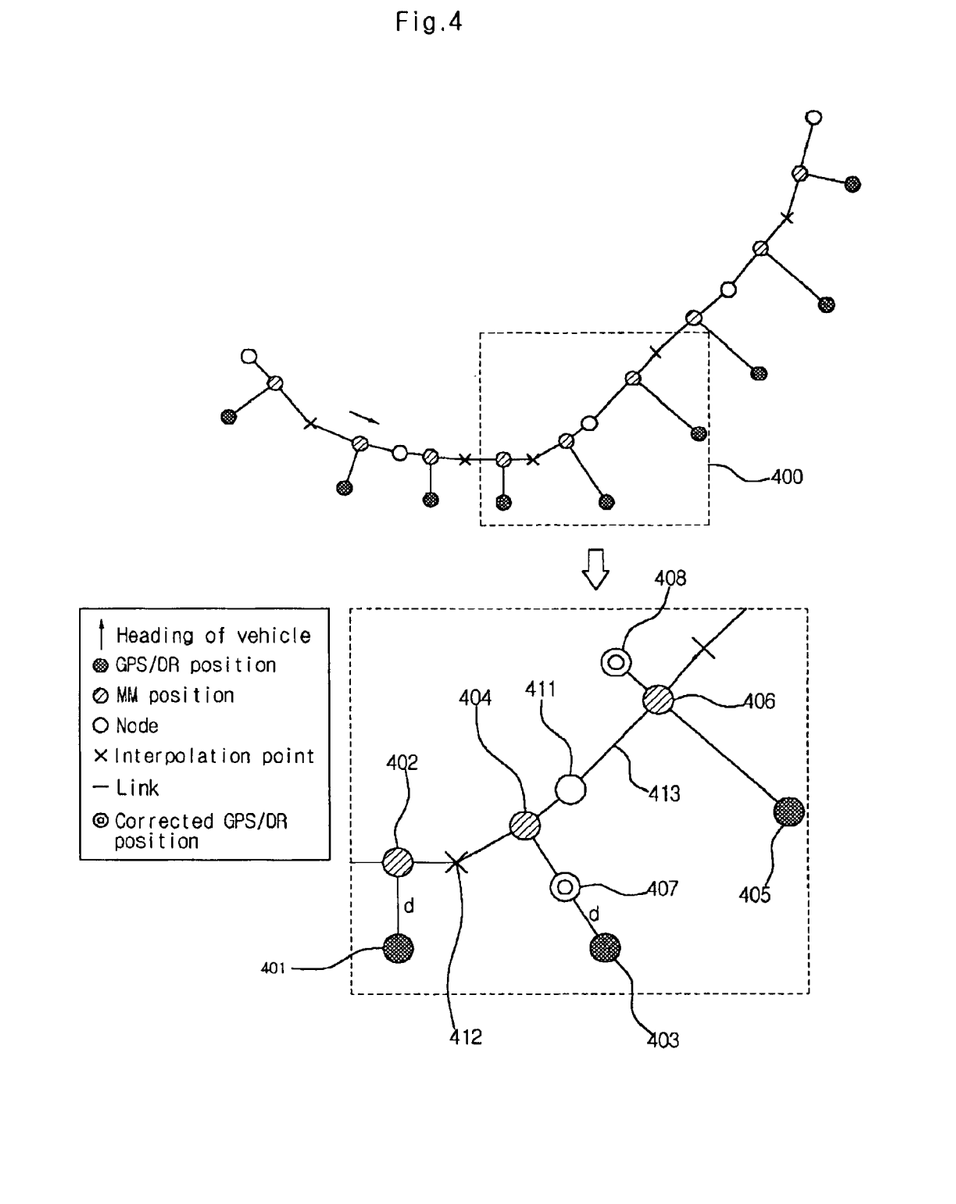
FIG. 4 is a diagram depicting a method for correcting a GPS and dead reckoning (DR) positions using a previous map matching value according to one embodiment of the present invention.

Then the sum of a new GPS value with the absolute correction distance (d) obtained previously is designated as a new GPS/DR. FIG. 4 illustrates GPS/DR positions corrected by using the previous map matching value within a search range 400 while an object is moving. Using GPS/DR position measurements 401, 403, and 405 and map matched value 402, 404 and 406, it is possible to obtain a new GPS/DR value 407 that is obtained by adding a new GPS/DR value 403 to a previous absolute correction distance (d). A spot 408 can be obtained using the same method.

In FIG. 4, at the spots 403 and 407 where the direction is changed from the left to the right having the link as a reference line, the sign of the constant (K) is not changed to (+1). However, the sign of the constant (K) is changed to (−1) at the spot 408 in order to change the direction from the right to the left.

The absolute correction distance (d) is obtained from Equation 3.

$$d = \sqrt{(x1, x2)^2 + (y1, y2)^2} \quad \text{[Equation 3]}$$

Here, x1 denotes a previously map matched x-displacement corrected value; y1 denotes a previously map matched y-displacement corrected value; x2 denotes a converted x-displacement corrected value of previous map matching using a current correction angle; and y2 denotes a converted y-displacement corrected value of previous map matching using a current correction angle, in which x2=d* sin(θ2), and y2=d* cos(θ2).

And, (x, y) of a new GPS value can also be obtained from the equation 3 using the correction angle θ2 and the absolute correction distance (d) obtained previously.

To obtain such displacement-corrected values, the displacement-corrected values (x, y) are separately calculated as shown in Equation 4. As manifested in Equation 4, x-displacement corrected value is obtained by subtracting a GPSx value from a map matched value MMx and adding the new GPS value obtained before. The y-displacement corrected value can be obtained using the same method.

$$x\text{-displacement corrected value} = (MMx - GPSx) + d * \sin(\theta 2) \quad \text{[Equation 4]}$$

$$y\text{-displacement corrected value} = (MMy - GPSy) + d * \cos(\theta 2)$$

If a constant (K) is added to those x- and y-displacement corrected values in Equation 4, respectively, the Equation 2 is obtained. Here, θ2 is the sum of a link angle and 90 degrees.

Using the displacement-corrected values obtained from the Equation 4, map matching is performed, and as for next map matching, the beeline (distance) between the original GPS value before its input and a link is again designated as the absolute correction distance (d).

As illustrated in FIGS. 3 and 4, sometimes position errors are made even when the moving object (i.e. vehicle) is running on the road without any problem. However, even when positioning errors are made by the position measurement devices in a navigation system, or when the digital map itself have errors, or when inaccurate position information is provided because the solid yellow line on the road is used as a reference regardless of the actual motion of the vehicle, the position error correction method of the invention enables an accurate map matching on a road link.

In summary, according to the method for correcting position error in a navigation system of the present invention, the current position measurement of the moving object is corrected to a previously map matched displacement-corrected value, and the current position of the moving object is matched with the link on the digital map. Therefore, accurate map matching can be performed regardless of possible errors in position measurement on curved roads. Also, even though errors are found in the digital map itself, and the moving object is marked around the central line (i.e. solid yellow line) differently from the actual motion of the object, the present invention method can accurately map match the moving object with the link on the digital map.

Figure 5:
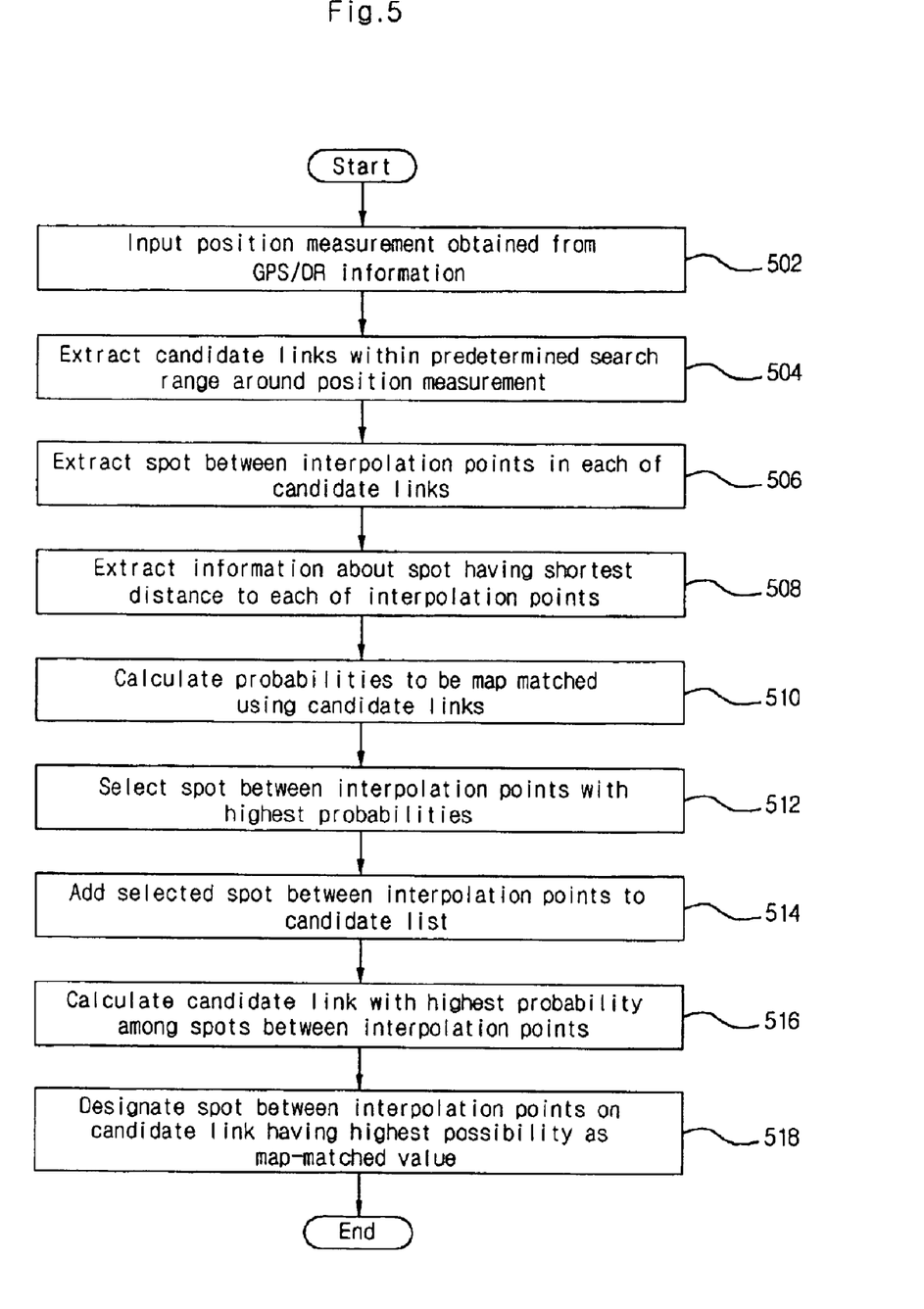
FIG. 5 is a flow chart describing a map matching method according to one embodiment of the present invention.

FIG. 5 is a map-matching algorithm of a navigation system according to another embodiment of the present invention.

Referring to FIG. 5, a position measurement is obtained using information from GPS and DR (S502), and using a position measurement device, candidate links within a certain search range around the position measurement are extracted (S504). In this embodiment, interpolation points always exist between links.

Then, a node between interpolation points within each candidate link is extracted (S506), and information on a spot with the shortest distance to each interpolation point on the candidate links is extracted (S508), and based on this information, the probabilities of map-matching with the candidate links are calculated (S510).

Among the spots between interpolation points being searched, one spot between interpolation points with the highest possibility is selected (S512), and the selected spot between interpolation points is added to a candidate list (S514).

Next, based on the spot between interpolation points having the highest possibility for each candidate link, one candidate link having the highest possibility to be map matched is calculated (S516). Finally, the spot between the interpolation points on the candidate link having the highest possibility to be map matched is designated as a map matching value (S518).

As such, using the position measurement of the moving object, the spot between interpolation points on the link with the highest possibility to be map matched is searched. Hence, whether or not the road is curved, map matching can be effectively performed on the interpolation points on the link with the highest possibility to be map matched.

While the invention has been shown and described with reference to certain preferred embodiments thereof, it will be understood by those skilled in the art that various changes in form and details may be made therein without departing from the spirit and scope of the invention as defined by the appended claims. For example, the present invention can also be applied to airplanes, ships, or portable PDAs and notebook computers having a built-in navigation system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for correcting position error in a navigation system, the method comprising the steps of:

receiving a current position measurement of a moving object from GPS/DR (Dead Reckoning)-based information;

correcting the current location measurement using at least one displacement-corrected value;

performing map matching using the corrected current position measurement;

calculating variation of correction angle by extracting a current correction angle out of the map matching result;

converting and correcting the displacement-corrected value in view of the current correction angle; and compensating the displacement-corrected value by applying a predetermined constant to the converted displacement-corrected value, and storing the compensated displacement-corrected value.

2. The method according to claim 1, wherein the variation of correction angle is a difference between a current correction angle being calculated and a previously map-matched correction angle, the current correction angle being calculated based on the map-matched position of the moving object and a link angle.

3. The method according to claim 1, wherein the current correction angle is calculated from a formula, atan2 $\{(MMx-GPSx), (Mmy-GPSy)\}$, wherein GPSx and GPSy denote X-axis and Y-axis measurements of the current position of the moving object; and MMx and Mmy are map-matched X-axis and Y-axis position measurements obtained by matching GPSx and GPSy with the map.

4. The method according to claim 1, wherein the displacement-corrected values are obtained in X-axis and Y-axis, respectively.

5. The method according to claim 1, wherein the displacement-corrected values are obtained by Equations below:

$$x\text{-displacement corrected value}=(MMx-GPx)+d*\sin(\text{link angle}+90°)$$

$$y\text{-displacement corrected value}=(Mmy-GPSy)+d*\cos(\text{link angle}+90°)$$

wherein, GPSx and GPSy are current location measurements of the moving object in X-axis and Y-axis; MMx and Mmy are map-matched X-axis and Y-axis position measurements obtained by matching GPSx and GPSy with the map; and d is an absolute correction distance, which is a straight distance between the current location measurement and the map-matched link position.

6. The method according to claim 5, wherein the absolute correction distance (d) is a straight distance between a GPS/DR-based location measurement and a map-matched location measurement.

7. The method according to claim 5, wherein the absolute correction distance (d) is obtained from Equation of $d=\sqrt{(x1,x2)^2+(y1,y2)^2}$, wherein x1 denotes a previously map matched x-displacement corrected value; y1 denotes a previously map matched y-displacement corrected value; x2 denotes a converted x-displacement corrected value of previous map matching using a current correction angle; and y2 denotes a converted y-displacement corrected value of previous map matching using a current correction angle.

8. The method according to claim 7, wherein the converted x-displacement corrected value (x2) of previous map matching using the current correction angle is obtained by x2=d* sin(θ2), and the converted y-displacement corrected value (y2) of previous map matching using the current correction angle is obtained by y2=d* cos(θ2), in which θ2 indicates an angle between a new GPS/DR position measurement and a map-matched value plotted on a Cartesian coordinate system using the direction of true north as a reference line.

9. The method according to claim 1, wherein a compensation coefficient of the displacement-corrected value indicates a directional compensation value along heading of the moving object, being +1 or −1.

10. The method according to claim 1, wherein a sign of a compensation coefficient of the displacement-corrected value changes if a variation angle between the current correction angle and the previous correction angle is less than a predetermined level, and if GPS and DR values change from the left side to the right side on a link.

11. The method according to claim 1, wherein a sign of a compensation coefficient of the displacement-corrected value changes if a variation angle between al ink angle and the current correction angle is in a predetermined range, and the corrected GPS value is located at the right side of a link.

12. The method according to claim 1, wherein compensated displacement-corrected values to which a compensation coefficient is respectively added are represented by Equations below:

$$x\text{-displacement corrected value}=(MMx-GPSx)+K*d*\sin(\text{link angle}=90°)$$

$$y\text{-displacement corrected value}=(Mmy-GPSy)+K*d*\cos(\text{link angle}=90°).$$

13. A method for correcting position error in a navigation system, the method comprising the steps of:

receiving a current position measurement of a moving object by making use of a GPS/DR (Dead Reckoning) method;

correcting the current location measurement using a previous displacement-corrected value;

performing map matching using the corrected current position measurement; and calculating out of the map matching result a variation of correction angle, and a compensated displacement-corrected value along heading by extracting a current correction angle out of the map matching result.

14. The method according to claim 13, further comprising the steps of:

after map matching is performed, calculating a variation angle by extracting correction angle out of the map matching result;

converting and correcting the previous displacement-corrected value in view of the current correction angle; and calculating a displaced-corrected value by compensating the displacement-corrected value by applying to the converted displacement-corrected value a predetermined constant opposite to a correction direction, and storing the compensated displacement-corrected value.

15. A method for correcting position error in a navigation system, the method comprising the steps of:

receiving a current position measurement of a vehicle obtained from a GPS signal and sensors installed in the vehicle;

correcting the current position measurement of the vehicle to a previously map-matched x- and y-displacement corrected values, and performing map matching on the corrected values;

calculating a current correction angle by extracting a map-matched position of the vehicle and a link angle;

calculating variation of correction angle between the current correction angle and a previously map-matched correction angle, and deciding whether the variation of correction angle is less than a predetermined angle;

if the variation of correction angle is not less than the predetermined angle, initializing x- and y-displacement corrected value to '0'; and storing x- and y-displacement corrected values being calculated.

16. A method for correcting position error in a navigation system, the method comprising the steps of:

receiving a GPS position measurement;

extracting candidate links within a predetermined search range around the GPS position measurement;

among a plurality of interpolation points on the candidate links, selecting a spot between interpolation points with highest possibilities; and among candidate links including the selected spot between interpolation points, selecting a link with a highest possibility of having a moving object, and performing map matching.

* * * * *